United States Patent
Xu et al.

(10) Patent No.: US 12,183,326 B2
(45) Date of Patent: Dec. 31, 2024

(54) SPEECH RECOGNITION ERROR CORRECTION METHOD, RELATED DEVICES, AND READABLE STORAGE MEDIUM

(71) Applicant: IFLYTEK CO., LTD., Anhui (CN)

(72) Inventors: Li Xu, Anhui (CN); Jia Pan, Anhui (CN); Zhiguo Wang, Anhui (CN); Guoping Hu, Anhui (CN)

( * ) Notice: Subject to any disclaimer, the term of this patent is extended or adjusted under 35 U.S.C. 154(b) by 240 days.

(21) Appl. No.: 17/773,641

(22) PCT Filed: Nov. 17, 2020

(86) PCT No.: PCT/CN2020/129314
§ 371 (c)(1),
(2) Date: May 2, 2022

(87) PCT Pub. No.: WO2021/104102
PCT Pub. Date: Jun. 3, 2021

(65) Prior Publication Data
US 2022/0383853 A1  Dec. 1, 2022

(30) Foreign Application Priority Data
Nov. 25, 2019 (CN) .......................... 201911167009.0

(51) Int. Cl.
*G10L 15/06* (2013.01)
*G10L 15/08* (2006.01)

(52) U.S. Cl.
CPC .............. *G10L 15/06* (2013.01); *G10L 15/08* (2013.01)

(58) Field of Classification Search
CPC ... G10L 15/06; G10L 15/08; G10L 2015/088; G10L 2015/228; G10L 15/16;
(Continued)

(56) References Cited

U.S. PATENT DOCUMENTS 9,576,578 B1 * 2/2017 Skobeltsyn ............ G10L 15/22
10,607,611 B1 * 3/2020 Shellef .................. G10L 15/01
(Continued)

FOREIGN PATENT DOCUMENTS

| CN | 101042867 A | 9/2007 |
| CN | 101567189 A | 10/2009 |

(Continued)

OTHER PUBLICATIONS

Japanese Office Action received in 2022-522366 dated May 31, 2023, pp. 1-14.
(Continued)

*Primary Examiner* — Thuykhanh Le
(74) *Attorney, Agent, or Firm* — Zhong Law, LLC

(57) ABSTRACT

A speech recognition error correction method and device, and a readable storage medium are provided. The method includes: acquiring to-be-recognized speech data and a first recognition result of the speech data, re-recognizing the speech data with reference to context information in the first recognition result to obtain a second recognition result, and determining a final recognition result based on the second recognition result. In the method, the speech data is re-recognized with reference to context information in the first recognition result, which fully considers context information in the recognition result and the application scenario of the speech data. If any error occurs in the first recognition result, the first recognition result is corrected based on the second recognition. Therefore, the accuracy of speech recognition can be improved.

9 Claims, 4 Drawing Sheets

(58) Field of Classification Search
CPC ..... G10L 15/32; G10L 15/1815; G10L 15/20; G10L 15/26; G10L 19/005; G10L 25/03; G06F 40/279
USPC .......................................................... 704/243
See application file for complete search history.

(56) References Cited

U.S. PATENT DOCUMENTS

| | | | | |
|---|---|---|---|---|
| 2001/0025241 | A1* | 9/2001 | Lange | G10L 15/26 704/235 |
| 2003/0105635 | A1* | 6/2003 | Graumann | G10L 15/30 704/E15.047 |
| 2004/0249637 | A1* | 12/2004 | Baker | G10L 15/1822 704/239 |
| 2004/0260543 | A1* | 12/2004 | Horowitz | G10L 15/26 704/E15.04 |
| 2006/0026003 | A1* | 2/2006 | Carus | G10L 15/22 704/E15.04 |
| 2006/0074661 | A1* | 4/2006 | Takaichi | G10L 15/22 704/E15.04 |
| 2006/0167685 | A1* | 7/2006 | Thelen | G06V 30/1423 704/E15.041 |
| 2006/0190249 | A1* | 8/2006 | Kahn | G10L 15/26 704/235 |
| 2007/0055515 | A1* | 3/2007 | Lassalle | G10L 13/08 704/243 |
| 2007/0299664 | A1* | 12/2007 | Peters | G06F 40/16 704/235 |
| 2008/0162137 | A1* | 7/2008 | Saitoh | G10L 15/22 704/E15.04 |
| 2009/0052636 | A1* | 2/2009 | Webb | H04M 3/53333 704/235 |
| 2009/0306981 | A1* | 12/2009 | Cromack | G06F 16/685 707/E17.103 |
| 2010/0070263 | A1* | 3/2010 | Goto | G06F 16/685 704/235 |
| 2011/0173000 | A1* | 7/2011 | Yamamoto | G10L 15/1815 704/E15.001 |
| 2012/0191449 | A1* | 7/2012 | Lloyd | H04M 1/6075 704/E15.001 |
| 2013/0030804 | A1* | 1/2013 | Zavaliagkos | G10L 15/24 704/235 |
| 2014/0195226 | A1 | 7/2014 | Yun et al. | |
| 2014/0278402 | A1* | 9/2014 | Charugundla | H04M 7/0024 704/235 |
| 2015/0058018 | A1 | 2/2015 | Georges et al. | |
| 2015/0073790 | A1* | 3/2015 | Steuble | G10L 15/26 704/235 |
| 2015/0100315 | A1* | 4/2015 | Bianco | H04M 3/42391 704/235 |
| 2015/0154956 | A1* | 6/2015 | Brown | G06F 16/353 704/235 |
| 2015/0262580 | A1* | 9/2015 | Bisani | G10L 15/26 704/235 |
| 2015/0269136 | A1* | 9/2015 | Alphonso | G10L 15/26 704/9 |
| 2015/0317975 | A1* | 11/2015 | Ruiz Rodriguez | H04M 3/533 704/235 |
| 2015/0371633 | A1* | 12/2015 | Chelba | G10L 15/063 704/240 |
| 2015/0379983 | A1* | 12/2015 | Siohan | G10L 15/063 704/244 |
| 2016/0111111 | A1* | 4/2016 | Levitt | G10L 21/013 704/226 |
| 2016/0179774 | A1* | 6/2016 | McAteer | G06F 40/232 704/9 |
| 2017/0133010 | A1 | 5/2017 | Printz | |
| 2017/0263248 | A1* | 9/2017 | Gruber | G06F 40/166 |
| 2018/0174589 | A1 | 6/2018 | Choi et al. | |
| 2018/0286405 | A1* | 10/2018 | Naka | H04M 3/5175 |
| 2019/0005946 | A1* | 1/2019 | Huang | G10L 15/04 |
| 2020/0027445 | A1* | 1/2020 | Raghunathan | G10L 15/32 |
| 2020/0243094 | A1* | 7/2020 | Thomson | G10L 15/28 |
| 2021/0056960 | A1* | 2/2021 | Howard | G10L 15/22 |
| 2021/0398521 | A1* | 12/2021 | Hwang | G10L 15/02 |
| 2022/0318571 | A1* | 10/2022 | Ikeda | G06F 40/232 |
| 2023/0223026 | A1* | 7/2023 | Grichnik | H04L 51/216 704/235 |
| 2023/0274729 | A1* | 8/2023 | Kapralova | G10L 15/06 704/244 |
| 2023/0274736 | A1* | 8/2023 | Prabhavalkar | G06N 20/10 704/231 |

FOREIGN PATENT DOCUMENTS

| | | |
|---|---|---|
| CN | 101876975 A | 11/2010 |
| CN | 103366741 A | 10/2013 |
| CN | 106875943 A | 6/2017 |
| CN | 107093423 A | 8/2017 |
| CN | 107391504 A | 11/2017 |
| CN | 107437416 A | 12/2017 |
| CN | 108428447 A | 8/2018 |
| CN | 109065054 A | 12/2018 |
| CN | 110021293 A | 7/2019 |
| CN | 110110041 A | 8/2019 |
| CN | 110956959 A | 4/2020 |
| EP | 3029669 A1 | 6/2016 |
| JP | 2003308094 A | 10/2003 |
| KR | 10-2020-0064181 A | 6/2020 |

OTHER PUBLICATIONS

European search report received in 20894295.3 dated May 10, 2023, pp. 9.
International Search Report and Written Opinion issued in PCT/CN2020/129314 mailed Feb. 19, 2021, 16 pages.
Chinese Office Action received in 201911167009.0 dated Jan. 10, 2023, pp. 10.

* cited by examiner

SPEECH RECOGNITION ERROR CORRECTION METHOD, RELATED DEVICES, AND READABLE STORAGE MEDIUM

TECHNICAL FIELD

This application is the national phase of International Patent Application No. PCT/CN2020/129314, titled "SPEECH RECOGNITION ERROR CORRECTION METHOD, RELATED DEVICES, AND READABLE STORAGE MEDIUM", filed on Nov. 17, 2020, which claims priority to Chinese Patent Application No. 201911167009.0, titled "SPEECH RECOGNITION ERROR CORRECTION METHOD, RELATED DEVICES, AND READABLE STORAGE MEDIUM ", filed on Nov. 25, 2019 with the China National Intellectual Property Administration, both of which are incorporated herein by reference in their entireties.

BACKGROUND

In recent years, due to the rapid development of artificial intelligence technologies, artificial intelligence devices gradually enter and become indispensable part of the life and work of the general public. As the most natural way of human-machine interaction, speech interaction is widely used in various artificial intelligence devices to facilitate communication between human and machines. In the process of speech interaction based on speech recognition technology, the machines "understand" human language to further serve human beings.

Currently, the speech recognition technology based on deep learning is maturing, and satisfactory recognition accuracy is achieved in general scenarios by using conventional speech recognition models. However, speech in some special scenarios (such as professional fields) usually includes some technical terms which are used infrequently in the general scenarios and therefore the conventional speech recognition model performs poorly when applied to recognize these words. In some special scenarios, recognition of speech including such words with the conventional speech recognition model often encounters errors, resulting in low accuracy in the speech recognition.

Therefore, there is an urgent need for the technical problem of improving the accuracy of speech recognition in this context.

SUMMARY

In view of the above problems, a speech recognition error correction method and device, and a readable storage medium are provided according to the present disclosure. The solutions are described below.

According to a first aspect of the present disclosure, a speech recognition error correction method is provided. The method includes:

acquiring to-be-recognized speech data and a first recognition result of the speech data;
re-recognizing the speech data with reference to context information in the first recognition result to obtain a second recognition result; and
determining a final recognition result based on the second recognition result.

According to a second aspect of the present disclosure, another speech recognition error correction method is provided. The method includes:

acquiring to-be-recognized speech data and a first recognition result of the speech data;
extracting a keyword from the first recognition result;
re-recognizing the speech data with reference to context information in the first recognition result and the keyword to obtain a second recognition result; and
determining a final recognition result based on the second recognition result.

In an embodiment, the extracting a keyword from the first recognition result includes:

extracting a field-specific word from the first recognition result as the keyword.

In an embodiment, the re-recognizing the speech data with reference to context information in the first recognition result and the keyword to obtain a second recognition result includes:

acquiring an acoustic feature of the speech data; and
inputting the acoustic feature of the speech data, the first recognition result and the keyword to a pre-trained speech recognition error correction model to obtain the second recognition result, where
the speech recognition error correction model is obtained by training a preset model using an error-correction training data set; and
the error-correction training data set comprises at least one group of error-correction training data, and each group of error-correction training data comprises an acoustic feature of a piece of speech data, a text corresponding to the piece of speech data, a first recognition result corresponding to the piece of speech data, and a keyword in the first recognition result.

In an embodiment, the inputting the acoustic feature of the speech data, the first recognition result and the keyword to a pre-trained speech recognition error correction model to obtain the second recognition result includes:

performing encoding and attention calculation on the acoustic feature of the speech data, the first recognition result and the keyword using the speech recognition error correction model and obtaining the second recognition result based on a calculation result.

In an embodiment, the performing encoding and attention calculation on the acoustic feature of the speech data, the first recognition result and the keyword using the speech recognition error correction model and obtaining the second recognition result based on a calculation result includes:

performing the encoding and attention calculation on each of the acoustic feature of the speech data, the first recognition result and the keyword using an encoding layer and an attention layer of the speech recognition error correction model to obtain the calculation result; and
decoding the calculation result using a decoding layer of the speech recognition error correction model to obtain the second recognition result.

In an embodiment, the performing encoding and attention calculation on the acoustic feature of the speech data, the first recognition result and the keyword using the speech recognition error correction model and obtaining the second recognition result based on an encoding and attention calculation result includes:

merging the acoustic feature of the speech data, the first recognition result and the keyword to obtain a merged vector;
performing, by the encoding layer and the attention layer of the speech recognition error correction model, encoding and attention calculation on the merged vector to obtain the calculation result; and decoding, by the decoding layer of the speech recognition error correction model, the calculation result to obtain the second recognition result.

In an embodiment, the performing encoding and attention calculation on the acoustic feature of the speech data, the first recognition result and the keyword using an encoding layer and an attention layer of the speech recognition error correction model to obtain the calculation result includes:

for each target object:
encoding, by the encoding layer of the speech recognition error correction model, the target object to obtain an acoustic advanced feature of the target object;
performing, by the attention layer of the speech recognition error correction model, attention calculation on a previous semantic vector related to the target object and a previous output result of the speech recognition error correction model to obtain a hidden layer state related to the target object; and
performing, by the attention layer of the speech recognition error correction model, attention calculation on the acoustic advanced feature of the target object and the hidden layer state related to the target object to obtain a semantic vector related to the target object, wherein the target object comprises the acoustic feature of the speech data, the first recognition result, and the keyword.

In an embodiment, the performing, by the encoding layer and the attention layer of the speech recognition error correction model, encoding and attention calculation on the merged vector to obtain the calculation result includes:

encoding, by the encoding layer of the speech recognition error correction model, the merged vector to obtain an acoustic advanced feature of the merged vector;
performing, by the attention layer of the speech recognition error correction model, attention calculation on a previous semantic vector related to the merged vector and a previous output result of the speech recognition error correction model to obtain a hidden layer state related to the merged vector; and
performing, by the attention layer of the speech recognition error correction model, attention calculation on the acoustic advanced feature of the merged vector and the hidden layer state related to the merged vector to obtain a semantic vector related to the merged vector.

In an embodiment, the determining a final recognition result based on the second recognition result includes:
acquiring a confidence of the first recognition result and a confidence of the second recognition result; and
determining one with a higher confidence between the first recognition result and the second recognition result as the final recognition result.

According to a third aspect of the present disclosure, a speech recognition error correction device is provided. The device includes an acquisition unit, a first speech recognition unit, and a recognition result determination unit.

The acquisition unit is configured to acquire to-be-recognized speech data and a first recognition result of the speech data.

The first speech recognition unit is configured to re-recognize the speech data with reference to context information in the first recognition result to obtain a second recognition result.

The recognition result determination unit is configured to determine a final recognition result based on the second recognition result.

According to a fourth aspect of the present disclosure, another speech recognition error correction device is provided. The device includes an acquisition unit, a keyword extraction unit, a second speech recognition unit and a recognition result determination unit.

The acquisition unit is configured to acquire to-be-recognized speech data and a first recognition result of the speech data.

The keyword extraction unit is configured to extract a keyword from the first recognition result.

The second speech recognition unit is configured to re-recognize the speech data with reference to context information in the first recognition result and the keyword to obtain a second recognition result.

The recognition result determination unit is configured to determine a final recognition result based on the second recognition result.

In an embodiment, the keyword extraction unit includes a field-specific word extraction unit.

The field-specific word extraction unit is configured to extract a field-specific word from the first recognition result as a keyword.

In an embodiment, the second speech recognition unit includes an acoustic feature acquisition unit and a model processing unit.

The acoustic feature acquisition unit is configured to acquire an acoustic feature of the speech data.

The model processing unit is configured to input the acoustic feature of the speech data, the first recognition result and the keyword to a pre-trained speech recognition error correction model to obtain the second recognition result. The speech recognition error correction model is obtained by training a preset model using an error-correction training data set.

The error-correction training data set includes at least one group of error correction training data and each group of error-correction training data includes an acoustic feature of a piece of speech data, a text corresponding to the piece of speech data, a first recognition result corresponding to the piece of speech data, and a keyword in the first recognition result.

In an embodiment, the model processing unit includes an encoding and attention calculation unit and a recognition unit.

The encoding and attention calculation unit is configured to perform encoding and attention calculation on the acoustic feature of the speech data, the first recognition result and the keyword using the speech recognition error correction model.

The recognition unit is configured to obtain the second recognition result based on the calculation result.

In an embodiment, the encoding and attention calculation unit includes a first encoding and attention calculation unit, and the recognition unit includes a first decoding unit;

The first encoding and attention calculation unit is configured to perform encoding and attention calculation on each of the acoustic feature of the speech data, the first recognition result and the keyword using an encoding layer and an attention layer of the speech recognition error correction model to obtain the calculation result.

The first decoding unit is configured to decode the calculation result using a decoding layer of the speech recognition error correction model to obtain the second recognition result.

In an embodiment, the model processing unit further includes a merging unit. The encoding and attention calculation unit includes a second encoding and attention calculation unit. The recognition unit includes a second decoding unit.

The merging unit is configured to merge the acoustic feature of the speech data, the first recognition result and the keyword to obtain a merged vector.

The second encoding and attention calculation unit is configured to perform encoding and attention calculation on the merged vector using the encoding layer and the attention layer of the speech recognition error correction model to obtain the calculation result.

The second decoding unit is configured to decode the calculation result using the decoding layer of the speech recognition error correction model to obtain the second recognition result.

In an embodiment, the first encoding and attention calculation unit includes a first encoding unit and a first attention calculation unit.

The first encoding unit is configured to encode each target object using the encoding layer of the speech recognition error correction model to obtain the acoustic advanced feature of the target object.

The first attention calculation unit is configured to perform attention calculation on a previous semantic vector related to each target object and a previous output result of the speech recognition error correction model using the attention layer of the speech recognition error correction model to obtain a hidden layer state related to the target object; and perform attention calculation on the acoustic advanced feature of the target object and the hidden layer state related to the target object using the attention layer of the speech recognition error correction model to obtain the semantic vector related to the target object. The target object includes the acoustic feature of the speech data, the first recognition result, and the keyword.

In an embodiment, the second encoding and attention calculation unit includes a second encoding unit and a second attention calculation unit.

The second encoding unit is configured to encode the merged vector using the encoding layer of the speech recognition error correction model to obtain the acoustic advanced feature of the merged vector.

The second attention calculation unit is configured to perform attention calculation on the previous semantic vector related to the merged vector and the previous output result of the speech recognition error correction model using the attention layer of the speech recognition error correction model to obtain a hidden layer state related to the merged vector; and perform attention calculation on the acoustic advanced feature of the merged vector and the hidden layer state related to the merged vector using the attention layer of the speech recognition error correction model to obtain the semantic vector related to the merged vector.

In an embodiment, the recognition result determination unit includes a confidence acquisition unit and a determination unit.

The confidence acquisition unit is configured to acquire a confidence of the first recognition result and a confidence of the second recognition result.

The determination unit is configured to determine one with a higher confidence between the first recognition result and the second recognition result as a final recognition result.

According to a fifth aspect of the present disclosure, a speech recognition error correction system is provided. The system includes a memory and a processor.

The memory is configured to store a program.

The processor is configured to execute the program to perform the foregoing speech recognition error correction method.

According to a sixth aspect of the present disclosure, a readable storage medium is provided. The readable storage medium stores a computer program that, when being executed by a processor, performs the foregoing speech recognition error correction method.

According to a seventh embodiment of the present disclosure, a computer program product is provided. The computer program product, when being executed on a terminal device, causes the terminal device to perform the foregoing speech recognition error correction method.

According to the technical solutions of the present disclosure, a speech recognition error correction method and device, and a readable storage medium are provided. The method includes: acquiring to-be-recognized speech data and a first recognition result of the speech data, re-recognizing the speech data with reference to context information in the first recognition result to obtain a second recognition result, and determining a final recognition result based on the second recognition result. In the method, the speech data is re-recognized with reference to context information in the first recognition result, with a sufficient consideration of context information in the recognition result and the application scenario of the speech data. If any error occurs in the first recognition result, the first recognition result is corrected based on the second recognition, thus improving the accuracy of speech recognition.

Based on the above, a keyword may further be extracted from the first recognition result. The speech data may be re-recognized with reference to the context information in the first recognition result and the keyword, thereby further improving accuracy of the second recognition result.

BRIEF DESCRIPTION OF THE DRAWINGS

By reading the detailed description of the preferred embodiments below, various other advantages and benefits are clear to those skilled in the art. The drawings are only used for illustrating the preferred embodiments rather than limiting the present disclosure. Throughout the drawings, the same reference numerals are used to represent the same components. In the drawings.

DETAILED DESCRIPTION OF EMBODIMENTS

Figure 1:
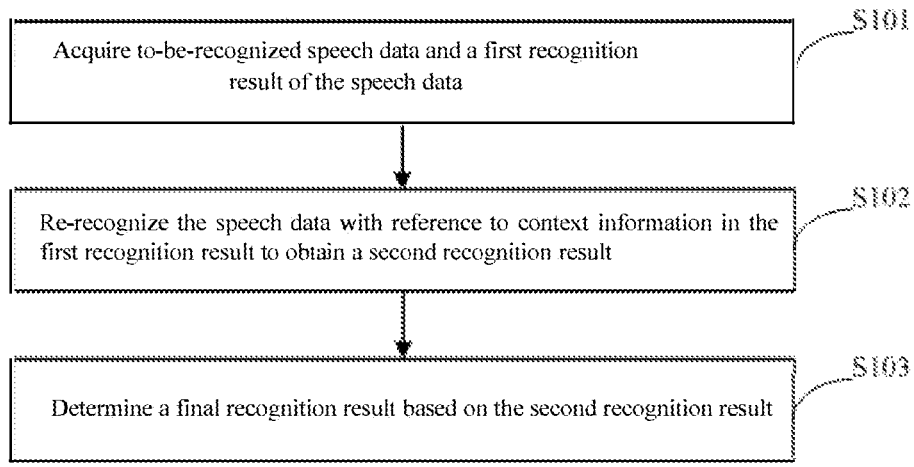
FIG. 1 is a flowchart of a speech recognition error correction method according to an embodiment of the present disclosure.

Technical solutions of embodiments of the present disclosure are clearly and completely described below in conjunction with the drawings of the embodiments of the present disclosure. Clearly, the embodiments described below are only some embodiments of the present disclosure, rather than all the embodiments. Any other embodiments obtained by those skilled in the art based on the embodiments in the present disclosure without any creative effort fall within the scope of the present disclosure.

To improve the accuracy of speech recognition in special scenarios (for example, professional fields), the applicant conducted research as follows.

Texts including field-specific words in a special scenario are collected as corpuses to optimize and customize a conventional speech recognition model. The customized and optimized model achieves high accuracy in recognizing speeches in this particular scenario. However, the customized and optimized model has lowered accuracy in recognizing speeches in general scenario as compared to the conventional speech recognition model.

In order to ensure accurate speech recognition in both general scenarios and special scenarios, it is desired to determine, before starting recognition, whether the to-be-recognized speech is generated in a general scenario or in a special scenario in advance. If the speech is generated in the general scenario, the recognition is performed using the conventional speech recognition model. If the speech is generated in the special scenario, the recognition is performed using the customized and optimized model. In this way, the accuracy of the speech recognition in both the general scenario and the special scenario are ensured. However, it is challenging for a speech recognition system to determine whether the to-be-recognized speech is generated in the general scenario or in the special scenario before starting the recognition.

In view above, the applicant conducted in-depth research and found that in the conventional speech recognition technology, once a recognition result is obtained based on a speech data stream, the recognition result is not corrected. However, in practical application, even though a first clause in the speech data stream is recognized incorrectly due to insufficient context information, a clause subsequent to the first clause can be recognized correctly due to sufficient context information. In other words, a same word may be recognized incorrectly in the first clause but be recognized correctly in a second clause.

For example, a speech of "Scientists from the Sok Institute in California found that autophagy reaction inhibits the occurrence of cancer, which is just the opposite of what many people thought in the past, so the therapies for inhibiting autophagy reaction may result in bad consequences" is recognized as "Scientists from the Sok Institute in California found that this reaction inhibits the occurrence of cancer, which is just the opposite of what many people thought in the past, so that the therapies for inhibiting autophagy reaction may result in bad consequences."

In the above example, there is not much related content in preceding text when the uncommon field-specific term "autophagy reaction" occurs for the first time, resulting in a recognition error. By contrast, the second occurrence of the term "autophagy reaction" follows the term "inhibiting", and a merged language model of "inhibiting autophagy reaction" has a high score, so that the recognition is correct.

Based on the above research, the applicant found that context information in the recognition result may impact the correctness of the recognition result. Therefore, based on the context information in a first recognition result of the to-be-recognized speech data, the to-be-recognized speech data may be re-recognized to obtain a second recognition result. In the second recognition result, a field-specific word mistakenly recognized in the first recognition result may be corrected, thus improving accuracy of the speech recognition result.

Based on the above considerations, the applicant propose a speech recognition error correction method. Next, the speech recognition error correction method according to the present disclosure is described in connection with the following embodiments.

Referring to FIG. 1, which is a flowchart of a speech recognition error correction method according to an embodiment of the present disclosure, the method may include the following steps S101 to S103.

In step S101, to-be-recognized speech data and a first recognition result of the to-be-recognized speech data are acquired.

In this embodiment, the to-be-recognized speech data is spoken by a user as needed in using an application, for example, speech data inputted by the user using speech input when sending a short message or chatting. The to-be-recognized speech data may be speech data in a general field or speech data in a special scenario (for example, a professional field).

In the present disclosure, the first recognition result of the to-be-recognized speech data may be acquired in a variety of ways. For example, the first recognition result may be acquired based on a neural network model. Clearly, other ways of acquiring the first recognition result of the to-be-recognized speech also fall within the scope of the present disclosure. For example, the first recognition result of the to-be-recognized speech data may be stored in advance and is directly acquired from a storage medium for usage.

In step S102, the speech data is re-recognized with reference to context information in the first recognition result to obtain a second recognition result.

From the research of the applicant discussed above, it can be seen that the context information in the recognition result has an impact on the correctness of the recognition result. Therefore, in this embodiment, the speech data may be re-recognized with reference to the context information in the first recognition result to obtain the second recognition result.

In this embodiment, there may be many implementations for re-recognizing the speech data with reference to the context information in the first recognition result to obtain the second recognition result. For example, the speech data may be re-recognized based on a neural network model.

Clearly, other implementations also fall within the scope of the present disclosure. For example, a field-specific word included in the first recognition result may be identified to find out, from other words in the first recognition result, a word which matches with the field-specific word at a degree higher than a preset limit and is not exactly the same as the field-specific word. The found word is replaced with the field-specific word to obtain the second recognition result.

In the foregoing example, for the first recognition result "Scientists from the Sok Institute in California found that this reaction inhibits the occurrence of cancer, which is just the opposite of what many people thought in the past, so that the therapies for inhibiting autophagy reaction may result in bad consequences", a field-specific word such as "autophagy reaction" may be extracted. Then words in the first recognition result are compared with. It is found that the term "this reaction" matches with "autophagy reaction" at a degree of 50%. Assuming that the preset lower limit is 30%, it indicates that "this reaction" in the first recognition result may be replaced with "autophagy reaction" to get the second recognition result: "Scientists from the Sok Institute in California found that autophagy reaction inhibits the occurrence of cancer, which is just the opposite of what many people thought in the past, so that the therapies for inhibiting autophagy reaction may result in bad consequences."

In step S103, a final recognition result is determined based on the second recognition result.

In the present disclosure, the second identification result may be directly determined as the final identification result. However, in some cases, the second recognition result may not be better than the first recognition result, and if the second recognition result is directly determined as the final recognition result, the recognition accuracy is lowered. Therefore, in this case, an optimal one between the first recognition result and the second recognition result is determined as the final recognition result.

There are many ways to determine the optimal one between the first recognition result and the second recognition result. As an implementation, a confidence of the first recognition result and a confidence of the second recognition result may be obtained, and the one with a higher confidence between the first recognition result and the second recognition result is determined as the final recognition result.

Clearly, other implementations also fall within the scope of the present disclosure. For example, an optimal identification result may be determined by manual verification from the first identification result and the second identification result.

A speech recognition error correction method is provided according to this embodiment. The method includes: acquiring to-be-recognized speech data and a first recognition result of the to-be-recognized speech data; re-recognizing the speech data with reference to context information in the first recognition result to obtain a second recognition result; and determining a final recognition result based on the second recognition result. In the method, the speech data is re-recognized with reference to context information in the first recognition result, therefore the application scenario of the context information in the recognition result is sufficiently considered. If the first recognition result is wrong, the first recognition result is corrected based on the re-recognition, thus improving the accuracy of speech recognition.

Figure 2:
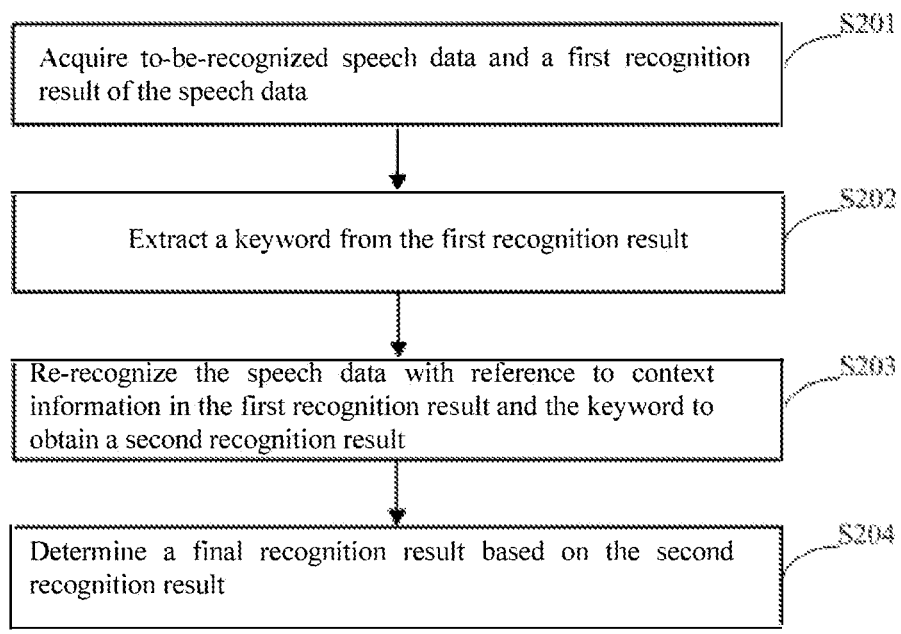
FIG. 2 is a flowchart of a speech recognition error correction method according to another embodiment of the present disclosure.

A speech recognition error correction method is further provided according to other embodiments of the present disclosure, in which a keyword may be extracted from the first recognition result, and thus the speech data may be re-recognized with reference to the context information and the keyword to further improve the accuracy of the second recognition result. Referring to FIG. 2, the method includes the following steps S201 to S203.

In step S201, to-be-recognized speech data and a first recognition result of the to-be-recognized speech data are acquired.

Step S201 is the same as step S101 described above. For detail implementation, one may refer to the above description and the implementation is not repeated herein.

In step S202, a keyword is extracted from the first recognition result.

In this embodiment, the keyword may be a field-specific word extracted from the first recognition result. That is to say, the keyword may be a word that is included in the first recognition result and related to a field. Usually, the keyword is a field-specific word. Examples of this kind of words may be "autophagy reaction", "bone traction", "renal biopsy" and the like in the medical field, "feedforward neural network", "pool layer" and the like in the computer field.

In step S203, the speech data is re-recognized with reference to context information in the first recognition result and the keyword to obtain a second recognition result.

In this embodiment, the speech data is re-recognized with reference to both the context information in the first recognition result and the keyword. There may be many implementations of obtaining the second recognition result. For example, the second recognition result may be obtained based on a neural network model.

Clearly, other implementations also fall within the scope of the present disclosure. For example, word included in the first recognition result which matches with the keyword at a degree higher than a preset limit and is not exactly the same as the keyword is found out. The found word is replaced with the keyword to obtain the second recognition result.

In step S204, a final recognition result is determined based on the second recognition result.

Step S204 is the same as step S103 described above. For detailed implementation, one may refer to the above description and the implementation is not repeated herein.

A speech recognition error correction method is disclosed in this embodiment. In the method, a keyword is extracted from the first recognition result. The keyword may be a field-specific word. Thus, the speech data is re-recognized with reference to the context information and the keyword in the first recognition result, thereby further improves the accuracy of the second recognition result.

In the present disclosure, in a case that the first recognition result of the to-be-recognized speech data is obtained based on a neural network model, the speech data may be inputted to a pre-trained speech recognition model to obtain the first recognition result. The pre-trained speech recognition model may be a conventional speech recognition model or a speech recognition model generated by training a preset model with a recognition-training data set. The recognition-training data set includes at least one group of recognition-training data, and each group of recognition-training data includes a text corresponding to a piece of speech data and an acoustic feature of the piece of speech data. The preset model may be any neural network model, which is not limited in the present disclosure.

It should be noted that in a case that the pre-trained speech recognition model is a speech recognition model generated by training a preset model with a recognition-training data set, each piece of recognition-training data in the set may be obtained by: acquiring a piece of speech data and manually labeling the speech data to obtain a text corresponding to the speech data; extracting an acoustic feature of the speech data; and generating a piece of recognition-training data, which includes the text corresponding to the speech data and the acoustic feature of the speech data.

In the present disclosure, there are many ways to acquire the speech data. For example, the speech data may be received through a microphone of an intelligent terminal. The intelligent terminal is an electronic device with a speech recognition function, such as a smart phone, a computer, a translator, a robot, a smart home, and a smart home appliance. Alternatively, pre-stored speech data may be acquired. Clearly, other ways to acquire the speech data also fall within the scope of the present disclosure, which is not limited in the present disclosure.

In the present disclosure, an acoustic feature of each piece of speech data may be a spectral feature of the speech data, for example, an MFCC (Mel frequency cepstral coefficient) or an FBank feature. In the present disclosure, the acoustic feature of each piece of speech data may be any extracted with any mainstream acoustic feature extraction method, which is not limited in the present disclosure.

In the present disclosure, the preset model to be trained may be a traditional attention-based encoder-decoder (encoding and decoding based on attention mechanism) or any other model structure, which is not limited in the present disclosure.

In the present disclosure, when training the preset model with the recognition-training data, the acoustic feature of each piece of speech data in the recognition-training data is taken as an input to the preset model and the text corresponding to the piece of speech data is taken as a training target, to train parameters of the preset model.

In the present disclosure, the keyword may be extracted from the first recognition result by using the Named Entity Recognition (NER) technology. Clearly, other implementations of extracting the keyword in the first recognition result also fall within the scope of the present disclosure. For example, the keyword may be extracted manually from the first recognition result.

At present, NER technology may be realized based on a neural network model. In this case, the keyword may be extracted from the first recognition result by: inputting the first recognition result to a pre-trained keyword extraction model to obtain the keyword in the first recognition result.

It should be noted that the keyword extraction model may be generated by training a preset model structure based on a data set for extraction-training. The data set includes at least one group of extraction-training data, and each group of extraction-training data includes a text in which field-specific terms are marked. Each text may be a text in a special scenario, in which the field-specific terms are marked by manual annotation.

The preset model may be a BiLSTM_CRF (bidirectional long-term and short-term memory model_conditional random field) model based on deep learning.

For example, the first recognition result of "Autophagy reaction inhibits the occurrence of cancer, which is just the opposite of what many people thought in the past, so that the therapies for inhibiting autophagy reaction may result in bad consequences" is inputted to the keyword extraction model, and the keyword extraction model outputs keywords: "autophagy reaction", "cancer" and "therapies".

In addition, NER technology may also be implemented based on a statistical model. In this case, the keyword may be extracted from the first recognition result by: inputting the first recognition result to the statistical model to obtain the keyword in the first recognition result. The way to construct the statistical model is known in the art and is not detailed in the present disclosure.

In the present disclosure, in a case that the speech data is re-recognized with reference to the context information in the first recognition result to obtain the second recognition result based on the neural network model, the acoustic feature of the speech data and the first recognition result may be inputted to the pre-trained speech recognition error correction model to obtain the second recognition result. The speech recognition error correction model is obtained by training a preset model with a data set for error-correction training. The data set includes at least one group of error-correction training data, and each group of error-correction training data includes an acoustic feature corresponding to a piece of speech data, a text corresponding to the piece of speech data and the first recognition result corresponding to the piece of speech data.

It should be noted that when training the speech recognition error correction model, the acoustic feature corresponding to the piece of speech data and the first recognition result corresponding to the piece of speech data are taken as input to the preset speech recognition error correction model structure, and the text corresponding to the piece of speech data is taken as a training target of the preset speech recognition error correction model structure.

Each group of error correction training data may be obtained by: acquiring a piece of speech data, manually marking the speech data to obtain a text corresponding to the speech data, extracting the acoustic feature of the speech data, and inputting the speech data to the pre-trained speech recognition model to obtain the first recognition result corresponding to the speech data.

In another embodiment, in a case that the speech data is re-recognized with reference to the context information in the first recognition result and the keyword to obtain the second recognition result based on the neural network model, the acoustic feature of the speech data, the first recognition result and the keyword may be inputted to the pre-trained speech recognition error correction model to obtain the second recognition result. The speech recognition error correction model is obtained by training the preset model with the error-correction training data set. The error-correction training data set includes at least one group of error-correction training data, and each group of error-correction training data includes an acoustic feature corresponding to a piece of speech data, a text corresponding to the piece of speech data, a first recognition result corresponding to the piece of speech data and the keyword in the first recognition result.

It should be noted that when training the speech recognition error correction model, the acoustic feature corresponding to the piece of speech data, the first recognition result corresponding to the piece of speech data and the keyword in the first recognition result are taken as input to the preset speech recognition error correction model structure, and the text corresponding to the piece of speech data is taken as a training target of the preset speech recognition error correction model structure.

Each group of error-correction training data may be obtained by: acquiring a piece of speech data, manually marking the speech data to obtain a text corresponding to the speech data, extracting the acoustic feature of the speech data, inputting the speech data to the pre-trained speech recognition model to obtain the first recognition result corresponding to the speech data, and inputting the first recognition result to the pre-trained keyword extraction model to obtain the keyword in the first recognition result.

In the embodiments of the present disclosure, the second recognition result may be obtained in two implementations. The two implementations are based on the speech recognition error correction model and the two implementations are different in input data of the model. In a first implementation, the acoustic feature of the speech data and the first recognition result are inputted to the model. In a second implementation, the acoustic feature of the speech data, the first recognition result and the keyword extracted from the first recognition result are inputted to the model. Namely, compared with the first implementation, the second implementation additionally inputs the keyword to the model.

Next, the processing of the speech recognition error correction model is described by taking the second implementation as an example.

In the present disclosure, the acoustic feature of the speech data, the first recognition result and the keyword are inputted to the pre-trained speech recognition error correction model to obtain the second recognition result by: encoding, by the speech recognition error correction model, the acoustic feature of the speech data, the first recognition result and the keyword, and performing, by the speech recognition error correction model, attention calculation to obtain the second recognition result.

Figure 3:
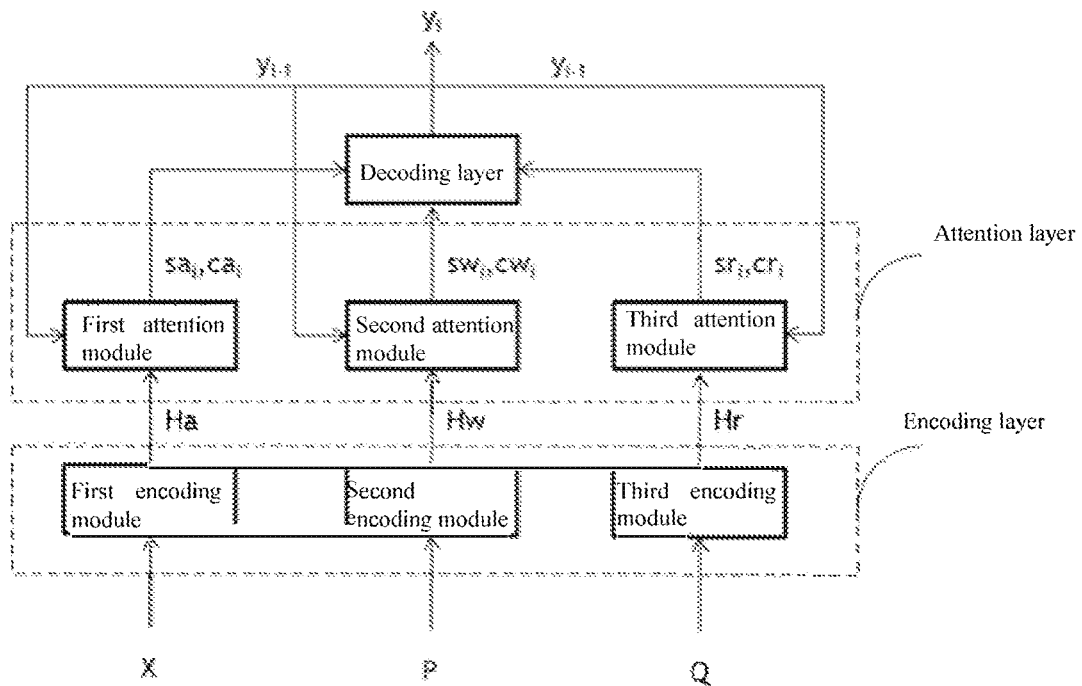
FIG. 3 is a schematic diagram of a topology structure of a preset model for training a speech recognition error correction model according to an embodiment of the present disclosure.

Reference is made to FIG. 3, which is a schematic diagram of a topology structure of a preset model for training the speech recognition error correction model according to an embodiment of the present disclosure. The model includes three layers, namely, an encoding layer, an attention layer and a decoding layer. A function of the encoding layer is to extract an advanced feature. A function of the attention layer is to calculate correlation between an input to the attention layer and a final output result. An output of the attention layer serves as an input to the decoding layer, and an output of the decoding layer serves as a current output result. The decoding layer may be a single-layer neural network with softmax, which is not limited in the present disclosure.

The encoding layer may further be divided into three parts, namely, a first encoding module, a second encoding module and a third encoding module.

The first encoding module, the second encoding module and the third encoding module may be in a structure of inverted-pyramid-shaped bidirectional recursive neural network (RNN) or convolutional neural network (CNN), which is not limited in the present disclosure.

The attention layer may also be divided into three parts, namely, a first attention module, a second attention module and a third attention module. The first attention module, the second attention module and the third attention module may be in a structure of bidirectional RNN or unidirectional RNN, which is not limited in the present disclosure.

The output of the attention layer serves as the input to the decoding layer, and the output of the decoding layer serves as the current output result. The decoding layer may be a single-layer neural network with softmax, which is not limited in the present disclosure.

An input to the first encoding module is the acoustic feature X of the to-be-recognized speech data, and an output of the first encoding module is an advanced acoustic feature Ha. An input to the second encoding module is characterization P of the first recognition result of the to-be-recognized speech data, and an output of the second encoding module is an advanced feature Hw of the characterization P of the first recognition result. An input to the third encoding module is characterization Q of a keyword in the first recognition result of the to-be-recognized speech data, and an output of the third encoding module is an advanced feature Hr of the characterization Q of the keyword.

A previous output result $y_{i-1}$ is a common input to the first attention module, the second attention module and the third attention module. In addition, the three parts have different inputs and outputs. An input to the first attention module is Ha, an output of the first attention module is a hidden layer state $sa_i$ and a semantic vector $ca_i$ related to the speech. An input to the second attention module is Hw, and an output of the second attention module is a hidden layer state $sw_i$ and a semantic vector $cw_i$ related to the first recognition result. An input to the third attention module is Hr, and an output of the third attention module is a hidden layer state $sr_i$ and a semantic vector $cr_i$ related to the keyword in the first recognition result.

The input to the decoding layer is the output $sa_i$, $ca_i$, $sw_i$, $cw_i$, $sr_i$ and $cr_i$ of the attention layer. The output of the decoding layer is the current output result $y_i$, and $y_i$ is the recognition result of the to-be-recognized speech data.

Generally, training is finished when $P(y_i)$ is greater than a predetermined threshold. $P(y_i)$ represents probability that the current output result is $y_i$, and $P(y_i)$=Decode($sa_i$, $sw_i$, $sr_i$, $ca_i$, $cw_i$, $cr_i$).

Based on the above model, as an implementation, in the present disclosure, the encoding, by the speech recognition error correction model, the acoustic feature of the speech data, the first recognition result and the keyword, and performing, by the speech recognition error correction model, attention calculation to obtain the second recognition result may include: encoding, by the encoding layer of the speech recognition error correction model, the acoustic feature of the speech data, the first recognition result and the keyword, and performing, by the attention layer of the speech recognition error correction model, attention calculation to obtain the calculation result; and decoding, by the decoding layer of the speech recognition error correction model, the calculation result to obtain the second recognition result.

The encoding, by the encoding layer of the speech recognition error correction model, the acoustic feature of the speech data, the first recognition result and the keyword, and performing, by the attention layer of the speech recognition error correction model, attention calculation to obtain the calculation result may include: encoding, by the encoding layer of the speech recognition error correction model, each target object to obtain an acoustic advanced feature of the target object; performing, by the attention layer of the speech recognition error correction model, attention calculation on a previous semantic vector related to the target object and a previous output result of the speech recognition error correction model, to obtain a hidden layer state related to the target object; and performing, by the attention layer of the speech recognition error correction model, attention calculation on the acoustic advanced feature of the target object and the hidden layer state related to the target object, to obtain a semantic vector related to the target object.

The target object includes the acoustic feature of the speech data, the first recognition result, and the keyword.

A detailed process is described below.

The first encoding module encodes the acoustic feature of the speech data to obtain the acoustic advanced feature of the speech data. The first attention module performs attention calculation on the previous semantic vector related to the speech data and the previous output result of the speech recognition error correction model to obtain the hidden layer state related to the speech data. The first attention module performs attention calculation on the acoustic advanced feature of the speech data and the hidden layer state related to the speech data to obtain the semantic vector related to the speech data.

The second encoding module encodes the first recognition result to obtain an advanced feature of the first recognition result. The second attention module performs attention calculation on the previous semantic vector related to the first recognition result and the previous output result of the speech recognition error correction model to obtain a hidden layer state related to the first recognition result. The second attention module performs attention calculation on the advanced feature of the first recognition result and the hidden layer state related to the first recognition result to obtain the semantic vector related to the first recognition result.

The third encoding module encodes the keyword to obtain an advanced feature of the keyword. The third attention module performs attention calculation on the previous semantic vector related to the keyword and the previous output result of the speech recognition error correction model to obtain a hidden layer state related to the keyword. The third attention module performs attention calculation on the advanced feature of the keyword and the hidden layer state related to the keyword to obtain the semantic vector related to the keyword.

It can be understood that the above example is an optional processing process of the speech recognition error correction model in a case that the input data includes the acoustic feature of the speech data, the first recognition result and the keyword. In a case that the input data includes the acoustic feature of the speech data and the first recognition result, all model structures and processing processes involving the keyword in FIG. 3 may be omitted, that is, the third encoding module and the third attention model are removed from the speech recognition error correction model without changing other model structures. For a specific process, one may refer to the above description and the process is not repeated herein.

Figure 4:
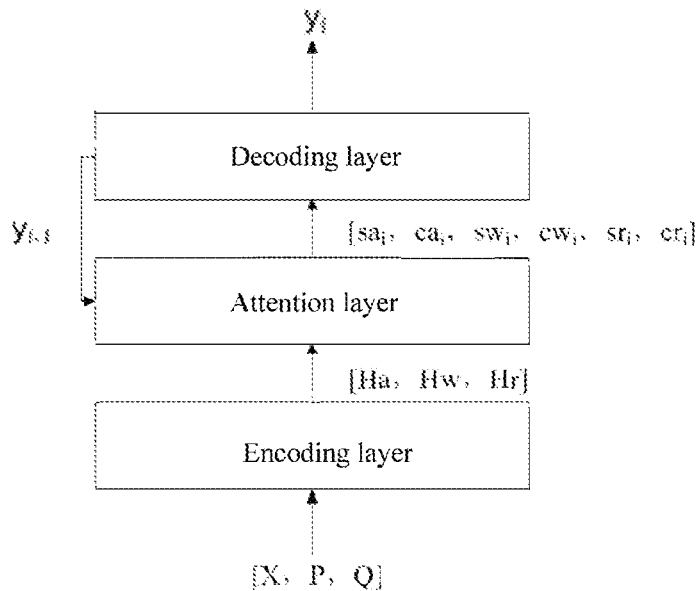
FIG. 4 is a schematic diagram of a topology structure of a preset model for training a speech recognition error correction model according to another embodiment of the present disclosure.

Further, still taking the second implementation as an example, reference is made to FIG. 4, which is a schematic diagram of a topology structure of a preset model for training the speech recognition error correction model according to another embodiment of the present disclosure. The model includes three layers, namely, an encoding layer, an attention layer and a decoding layer. A function of the encoding layer is to extract an advanced feature. A function of the attention layer is to calculate correlation between an input to the attention layer and a final output result. An output of the attention layer serves as an input to the decoding layer, and an output of the decoding layer serves as a current output result. The decoding layer may be a single-layer neural network with softmax, which is not limited in the present disclosure.

The input to the encoding layer is a merged vector [X, P, Q] formed by the acoustic feature X of the to-be-recognized speech data, the characterization P of the first recognition result of the to-be-recognized speech data, and the characterization Q of the keyword in the first recognition result. The output of the encoding layer is a merged vector [Ha, Hw, Hr] formed by the advanced feature Ha of the acoustic feature, the advanced feature Hw of the characterization P of the first recognition result of the to-be-recognized speech data, and the advanced feature Hr of the characterization Q of the keyword in the first recognition result.

The output of the encoding layer and a previous output result $y_{i-1}$ of the model serve as an input to the attention layer. An output of the attention layer is a vector $[sa_i, ca_i, sw_i, cw_i, sr_i, cr_i]$ formed by a hidden layer state $sa_i$ and a semantic vector $ca_i$ that are related to the speech, a hidden layer state $sw_i$ and a semantic vector $cw_i$ that are related to the first recognition result, a hidden layer state $sr_i$ and a semantic vector $cr_i$ that are related to the keyword in the first recognition result.

The output of the attention layer serves as the input to the decoding layer. The output of the decoding layer serves as a current output result $y_i$, and $y_i$ is the recognition result of the to-be-recognized speech data.

Based on the above model, as an implementation in the present disclosure, the encoding, by the speech recognition error correction model, the acoustic feature of the speech data, the first recognition result and the keyword, and performing, by the speech recognition error correction model, attention calculation to obtain the second recognition result based on a calculation result may include: merging the acoustic feature of the speech data, the first recognition result and the keyword to obtain a merged vector; performing, by the encoding layer and the attention layer of the speech recognition error correction model, encoding and attention calculation on the merged vector to obtain the calculation result; and decoding, by the decoding layer of the speech recognition error correction model, the calculation result to obtain the second recognition result.

The performing, by the encoding layer and the attention layer of the speech recognition error correction model, encoding and attention calculation on the merged vector to obtain the calculation result may include: encoding, by the encoding layer of the speech recognition error correction model, the merged vector to obtain an acoustic advanced feature of the merged vector; performing, by the attention layer of the speech recognition error correction model, attention calculation on a previous semantic vector related to the merged vector and the previous output result of the speech recognition error correction model to obtain a hidden layer state related to the merged vector; and performing, by the attention layer of the speech recognition error correction model, attention calculation on the acoustic advanced feature of the merged vector and the hidden layer state related to the merged vector to obtain the semantic vector related to the merged vector.

It should be noted that in the conventional speech recognition model, the attention layer mainly focuses on correlation between the output result of the conventional speech recognition model and the acoustic feature of the speech data. In the speech recognition error correction model according to the present disclosure, the first recognition result of the speech data and the keyword in the first recognition result are integrated into the attention layer, so that the output result of the speech recognition error correction model is related to error correction information of the recognition result and the context information in the recognition result. In such manner, the speech recognition error correction model may learn an attention mechanism in which the output result is related to the context information, and may learn an attention mechanism in which the output result is related to error-correction, whereby finding out the context information and error correction information needed for the current speech data, i.e., automatically selecting whether or not to pay attention to the first recognition result and the keyword information in the first recognition result based on the inputted speech data. That is to say, the speech recognition error correction model has an ability of automatic error correction based on the first recognition result and the keyword in the first recognition result.

It can be understood that the above example shows another optional processing process of the speech recognition error correction model in a case that the input data includes the acoustic feature of the speech data, the first recognition result and the keyword. In a case that the input data includes the acoustic feature of the speech data and the first recognition result, the input to the encoding layer shown in FIG. 4 is a merged vector [X, P] formed by the acoustic feature X of the to-be-recognized speech data and the characterization P of the first recognition result of the to-be-recognized speech data, and the output of the encoding layer is a merged vector [Ha, Hw] formed by the advanced feature Ha of the acoustic feature and the advanced feature Hw of the characterization P of the first recognition result. Further, the output result of the attention layer is a vector [$sa_i$, $ca_i$, $sw_i$, $cw_i$] formed by the hidden layer state $sa_i$ and the semantic vector $ca_i$ that are related to speech, and the hidden layer state $sw_i$ and the semantic vector $cw_i$ that are related to the first recognition result. The output of the attention layer serves as the input to the decoding layer. The output of the decoding layer serves as the current output result $y_i$, and $y_i$ is the recognition result of the to-be-recognized speech data.

In other words, in a case that data inputted to the model does not include the keyword, a merged vector inputted to the encoding layer does not include the information of the keyword. Other layers of the model may process the input from the encoding layer in similar logic and reference may be made to the above description, which is not repeated herein.

In addition, an implementation for generating a recognition-training data set and an error-correction training data set is further provided according to the present disclosure, which is described in detail below.

Speech data for training a speech recognition model and a speech recognition error correction model is collected. The speech data may be received through a microphone of a smart terminal. The smart terminal is an electronic device with a speech recognition function, for example, a smart phone, a computer, a translator, a robot, a smart home (home appliance), and the like. Then each piece of speech data is manually marked, that is, each piece of speech data is manually transcribed into text data. An acoustic feature of each piece of speech data is extracted. The acoustic feature is generally a spectral feature of the speech data, for example, an MFCC feature, an FBank feature and other feature. The acoustic feature may be extracted in a conventional manner, which is not repeated herein. Finally, the acoustic feature of the speech data and the manually marked text corresponding to the speech data are obtained.

The acoustic feature of the speech data and the manually marked text corresponding to the speech data obtained in the above steps are divided into two parts. In the present disclosure, a first part is represented by a set A and a second part is represented by a set B. For example, 1 million groups of the acoustic features of the speech data and the manually marked texts corresponding to the speech data obtained in the above steps are randomly divided into two sets of equal amount, namely, set A and set B. Each of the set A and the set B includes multiple groups of training data, and each group of training data includes an acoustic feature of a piece of speech data and a manually marked text corresponding to the piece of speech data.

Training is performed by using the set A as the recognition-training data set to obtain a speech recognition model.

The set B is inputted into the trained speech recognition model to obtain recognition results corresponding to the set B. Then the recognition results corresponding to the set B are inputted into a keyword extraction model to obtain keywords in the recognition results corresponding to the set B. The acoustic features, the manually marked texts, the recognition results and the keywords corresponding to the set B form a set C. The set C includes multiple groups of training data, and each group of training data includes an acoustic feature corresponding to a piece of speech data, a manually marked text corresponding to the piece of speech data, a recognition result corresponding to the piece of speech data and a keyword in the recognition result.

Training is performed by using the set C as the error-correction training data set to obtain the speech recognition error correction model.

It should be further noted that the set B may be inputted into the trained speech recognition model to obtain Nbest recognition results corresponding to the set B. Then each recognition result is inputted into the keyword extraction model to obtain the keyword in the recognition result. If the set B includes n pieces of speech data and each piece of speech corresponds to Nbest recognition results, then n*N groups of training data are finally obtained. This processing enriches the error correction training data set and improves the coverage of the speech recognition error correction model.

It can be understood that each of the recognition-training data set and the error correction training data set includes keywords. If the input to the speech recognition error correction model only includes the acoustic feature of the speech data and the first recognition result, that is, the input data does not include the keyword, then the step of obtaining the keywords in the above process may be omitted. The finally obtained recognition-training data set and error correction training data set are not required to include the keywords.

A speech recognition error correction device according to an embodiment of the present disclosure is described below. The speech recognition error correction device described below and the speech recognition error correction method described above may be cross referenced.

Figure 5:
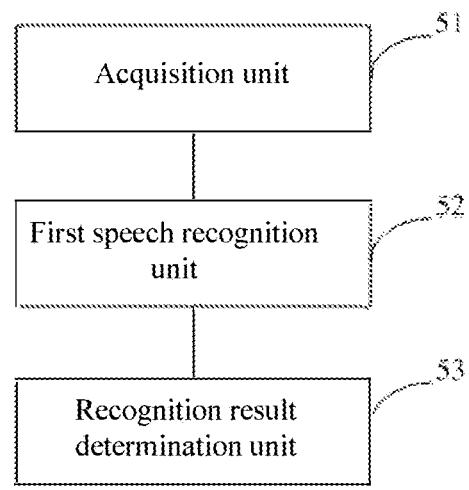
FIG. 5 is a schematic structural diagram of a speech recognition error correction device according to an embodiment of the present disclosure.

Reference is made to FIG. 5, which is a schematic structural diagram of a speech recognition error correction device according to an embodiment of the present disclosure. As shown in FIG. 5, the speech recognition error correction device includes an acquisition unit 51, a first speech recognition unit 52 and a recognition result determination unit 53.

The acquisition unit 51 is configured to acquire to-be-recognized speech data and a first recognition result of the speech data.

The first speech recognition unit 52 is configured to re-recognize the speech data with reference to context information in the first recognition result to obtain a second recognition result.

The recognition result determination unit 53 is configured to determine a final recognition result based on the second recognition result.

Figure 6:
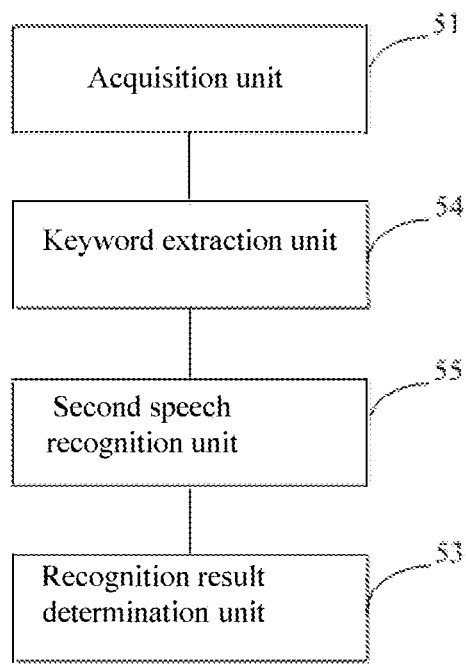
FIG. 6 is a schematic structural diagram of a speech recognition error correction device according to another embodiment of the present disclosure.

In other embodiment of the present disclosure, another speech recognition error correction device is provided. As shown in FIG. 6, the speech recognition error correction device includes an acquisition unit 51, a keyword extraction unit 54, a second speech recognition unit 55, and a recognition result determination unit 53.

The acquisition unit 51 is configured to acquire to-be-recognized speech data and a first recognition result of the speech data.

The keyword extraction unit 54 is configured to extract a keyword from the first recognition result.

The second speech recognition unit 55 is configured to re-recognize the speech data with reference to context information in the first recognition result and the keyword to obtain a second recognition result.

The recognition result determination unit 53 is configured to determine a final recognition result based on the second recognition result.

In an embodiment, the keyword extraction unit includes a field-specific word extraction unit.

The field-specific word extraction unit is configured to extract a field-specific word from the first recognition result as a keyword.

In an embodiment, the second speech recognition unit includes an acoustic feature acquisition unit and a model processing unit.

The acoustic feature acquisition unit is configured to acquire an acoustic feature of the speech data.

The model processing unit is configured to input the acoustic feature of the speech data, the first recognition result and the keyword to a pre-trained speech recognition error correction model to obtain the second recognition result. The speech recognition error correction model is obtained by training a preset model using an error-correction training data set.

The error-correction training data set includes at least one group of error-correction training data, and each group of error-correction training data includes an acoustic feature of a piece of speech data, a text corresponding to the piece of speech data, a first recognition result corresponding to the piece of speech data, and a keyword in the first recognition result.

In an embodiment, the model processing unit includes an encoding and attention calculation unit and a recognition unit.

The encoding and attention calculation unit is configured to perform encoding and attention calculation on the acoustic feature of the speech data, the first recognition result and the keyword using the speech recognition error correction model.

The recognition unit is configured to obtain the second recognition result based on the calculation result.

In an embodiment, the encoding and attention calculation unit includes a first encoding and attention calculation unit, and the recognition unit includes a first decoding unit;

The first encoding and attention calculation unit is configured to perform encoding and attention calculation on each of the acoustic feature of the speech data, the first recognition result and the keyword using the encoding layer and the attention layer of the speech recognition error correction model to obtain the calculation result.

The first decoding unit is configured to decode the calculation result using the decoding layer of the speech recognition error correction model to obtain the second recognition result.

In an embodiment, the model processing unit further includes a merging unit. The encoding and attention calculation unit includes a second encoding and attention calculation unit. The recognition unit includes a second decoding unit.

The merging unit is configured to merge the acoustic feature of the speech data, the first recognition result and the keyword to obtain a merged vector.

The second encoding and attention calculation unit is configured to perform encoding and attention calculation on the merged vector using the encoding layer and the attention layer of the speech recognition error correction model to obtain the calculation result.

The second decoding unit is configured to decode the calculation result using the decoding layer of the speech recognition error correction model to obtain the second recognition result.

In an embodiment, the first encoding and attention calculation unit includes a first encoding unit and a first attention calculation unit.

The first encoding unit is configured to encode each target object using the encoding layer of the speech recognition error correction model to obtain the acoustic advanced feature of the target object.

The first attention calculation unit is configured to perform attention calculation on a previous semantic vector related to each target object and a previous output result of the speech recognition error correction model using the attention layer of the speech recognition error correction model to obtain a hidden layer state related to the target object; and perform attention calculation on the acoustic advanced feature of the target object and the hidden layer state related to the target object using the attention layer of the speech recognition error correction model to obtain the semantic vector related to the target object. The target object includes the acoustic feature of the speech data, the first recognition result, and the keyword.

In an embodiment, the second encoding and attention calculation unit includes a second encoding unit and a second attention calculation unit.

The second encoding unit is configured to encode the merged vector using the encoding layer of the speech recognition error correction model to obtain the acoustic advanced feature of the merged vector.

The second attention calculation unit is configured to perform attention calculation on the previous semantic vector related to the merged vector and the previous output result of the speech recognition error correction model using the attention layer of the speech recognition error correction model to obtain a hidden layer state related to the merged vector; and perform attention calculation on the acoustic advanced feature of the merged vector and the hidden layer state related to the merged vector using the attention layer of the speech recognition error correction model to obtain the semantic vector related to the merged vector.

In an embodiment, the recognition result determination unit includes a confidence acquisition unit and a determination unit.

The confidence acquisition unit is configured to acquire a confidence of the first recognition result and a confidence of the second recognition result.

The determination unit is configured to determine one with a higher confidence between the first recognition result and the second recognition result as a final recognition result.

Figure 7:
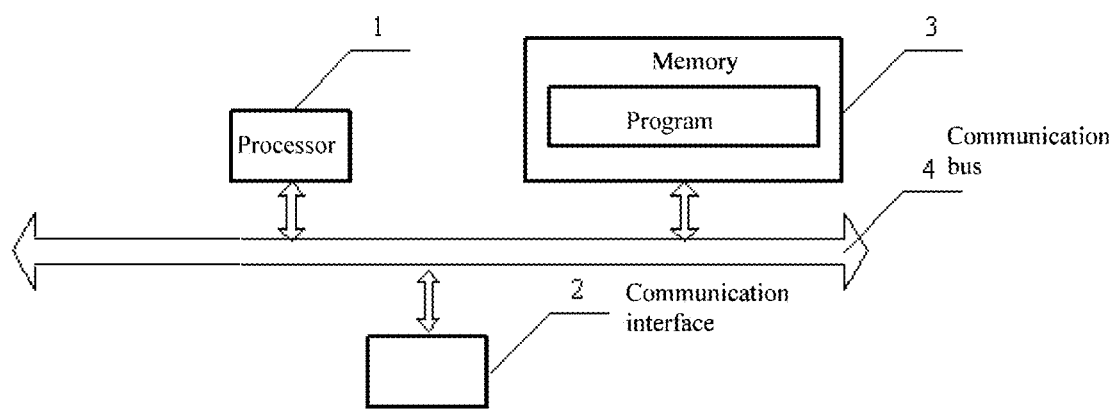
FIG. 7 is a block diagram of a hardware structure of a speech recognition error correction system according to an embodiment of the present disclosure.

FIG. 7 is a block diagram of a hardware structure of a speech recognition error correction system according to an embodiment of the present disclosure. Referring to FIG. 7, the hardware structure of the speech recognition error correction system includes at least one processor 1, at least one communication interface 2, at least one memory 3 and at least one communication bus 4.

In the embodiment of the present disclosure, there is at least one processor 1, at least one communication interface 2, at least one memory 3 and at least one communication bus 4. In addition, the processor 1, the communication interface 2 and the memory 3 communicates with each other through the communication bus 4.

The processor 1 may be a central processing unit (CPU), an application specific integrated circuit (ASIC), or one or more integrated circuits configured to implement embodiments of the present disclosure.

The memory 3 may include a high-speed RAM memory, a non-volatile memory and the like, for example, at least one disk memory.

The memory stores a program, and the processor calls the program stored in the memory. The program is used for:

acquiring to-be-recognized speech data and a first recognition result of the to-be-recognized speech data; re-recognizing the speech data with reference to the context information in the first recognition result to obtain a second recognition result; and determining a final recognition result based on the second recognition result.

Alternatively, the program is used for: acquiring to-be-recognized speech data and a first recognition result of the to-be-recognized speech data; extracting a keyword from the first recognition result; re-recognizing the speech data with reference to the context information in the first recognition result and the keyword to obtain a second recognition result; and determining a final recognition result based on the second recognition result.

For specific function and expanded function of the program, one may refer to the above descriptions.

A storage medium is further provided according to an embodiment of the present disclosure. The storage medium stores a program executable by a processor. The program is used for: acquiring the to-be-recognized speech data and a first recognition result of the to-be-recognized speech data; re-recognizing the speech data with reference to the context information in the first recognition result to obtain a second recognition result; and determining a final recognition result based on the second recognition result.

Alternatively, the program may be used for: acquiring the to-be-recognized speech data and a first recognition result of the to-be-recognized speech data; extracting a keyword from the first recognition result; re-recognizing the speech data with reference to the context information in the first recognition result and the keyword to obtain a second recognition result; and determining a final recognition result based on the second recognition result.

For specific function and expanded function of the program, one may refer to the above descriptions.

A computer program product is further provided according to an embodiment of the present disclosure. The computer program product, when being executed on a terminal device, causes the terminal device to perform any implementation of the speech recognition error correction method.

Finally, it should be noted that in the present disclosure, relationship terms such as "first" and "second" are merely for distinguishing one entity or operation from another entity or operation rather than indicating or implying an actual relationship or order between these entities or operations. In addition, in this specification, terms of "include", "comprise" or any other variants are intended to be non-exclusive. Therefore, a process, method, article or device including multiple elements includes not only the elements but also other elements that are not enumerated, or also include elements inherent in the process, method, article or device. Unless expressively limited otherwise, the statement "comprising (including) one . . . " does not exclude a case that other similar elements may exist in the process, method, article or device.

It should be noted that the embodiments in this specification are described in a progressive way, each of which emphasizes the differences from others. The embodiments may be combined with each other, and for the same or similar parts among the embodiments, one may refer to description of other embodiments.

With the description of the embodiments disclosed above, those skilled in the art may implement or use technical solutions of the present disclosure. Numerous modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

What is claimed is:

1. A speech recognition error correction method comprising:
   acquiring to-be-recognized speech data and a first recognition result of the speech data;
   extracting a correctly recognized field-specific word from the first recognition result as a keyword;
   re-recognizing the speech data with reference to context information in the first recognition result and the keyword to obtain a second recognition result, comprising:
     acquiring an acoustic feature of the speech data; and
     inputting the acoustic feature of the speech data, the first recognition result and the keyword to a pre-trained speech recognition error correction model to obtain the second recognition result, wherein the speech recognition error correction model is obtained by training a preset model with an error-correction training data set, wherein the speech recognition error correction model is a neural network-based model, wherein the inputting the acoustic feature of the speech data, the first recognition result and the keyword to the pre-trained speech recognition error correction model to obtain the second recognition result comprises performing encoding and attention calculation on the acoustic feature of the speech data, the first recognition result and the keyword by using the speech recognition error correction model, to obtain the second recognition result based on a calculation result, wherein the performing encoding and attention calculation on the acoustic feature of the speech data, the first recognition result and the keyword by using the speech recognition error correction model to obtain the second recognition result based on the calculation result comprises:
       performing encoding and attention calculation on each of the acoustic feature of the speech data, the first recognition result and the keyword by using an encoding layer and an attention layer of the speech recognition error correction model to obtain the calculation result; and
       decoding the calculation result by using a decoding layer of the speech recognition error correction model to obtain the second recognition result; and
   determining a final recognition result based on the second recognition result.

2. The method according to claim 1, wherein
   the error-correction training data set comprises at least one group of error-correction training data, and each group of error-correction training data comprises an acoustic feature of a piece of speech data, a text corresponding to the piece of speech data, a first recognition result corresponding to the piece of speech data, and a keyword in the first recognition result.

3. The method according to claim 1, wherein the performing encoding and attention calculation on the acoustic feature of the speech data, the first recognition result and the keyword by using the speech recognition error correction model to obtain the second recognition result based on a calculation result comprises:

merging the acoustic feature of the speech data, the first recognition result and the keyword to obtain a merged vector;

performing, by an encoding layer and an attention layer of the speech recognition error correction model, encoding and attention calculation on the merged vector to obtain the calculation result; and decoding, by a decoding layer of the speech recognition error correction model, the calculation result to obtain the second recognition result.

4. The method according to claim 3, wherein the performing, by the encoding layer and the attention layer of the speech recognition error correction model, encoding and attention calculation on the merged vector to obtain the calculation result comprises:

encoding, by the encoding layer of the speech recognition error correction model, the merged vector to obtain an acoustic advanced feature of the merged vector;

performing, by the attention layer of the speech recognition error correction model, attention calculation on a previous semantic vector related to the merged vector and a previous output result of the speech recognition error correction model to obtain a hidden layer state related to the merged vector; and performing, by the attention layer of the speech recognition error correction model, attention calculation on the acoustic advanced feature of the merged vector and the hidden layer state related to the merged vector to obtain a semantic vector related to the merged vector.

5. The method according to claim 1, wherein the performing encoding and attention calculation on each of the acoustic feature of the speech data, the first recognition result and the keyword by using an encoding layer and an attention layer of the speech recognition error correction model to obtain the calculation result comprises:

for each target object:

encoding, by the encoding layer of the speech recognition error correction model, the target object to obtain an acoustic advanced feature of the target object;

performing, by the attention layer of the speech recognition error correction model, attention calculation on a previous semantic vector related to the target object and a previous output result of the speech recognition error correction model to obtain a hidden layer state related to the target object; and performing, by the attention layer of the speech recognition error correction model, attention calculation on the acoustic advanced feature of the target object and the hidden layer state related to the target object to obtain a semantic vector related to the target object, wherein the target object comprises the acoustic feature of the speech data, the first recognition result, and the keyword.

6. The method according to claim 1, wherein the determining a final recognition result based on the second recognition result comprises:

acquiring a confidence of the first recognition result and a confidence of the second recognition result; and determining one with a higher confidence between the first recognition result and the second recognition result as the final recognition result.

7. A speech recognition error correction system comprising:

a memory configured to store a program; and a processor configured to execute the program to perform the speech recognition error correction method according to claim 1.

8. A non-transitory machine readable storage medium storing a computer program, wherein the computer program, when being executed by a processor, implements the speech recognition error correction method according to claim 1.

9. A speech recognition error correction device comprising:

an acquisition unit configured to acquire to-be-recognized speech data and a first recognition result of the speech data;

a keyword extraction unit configured to extract a correctly recognized field-specific word from the first recognition result as a keyword;

a second speech recognition unit configured to re-recognize the speech data with reference to context information in the first recognition result and the keyword to obtain a second recognition result, comprising:

acquiring an acoustic feature of the speech data; and inputting the acoustic feature of the speech data, the first recognition result and the keyword to a pre-trained speech recognition error correction model to obtain the second recognition result, wherein the speech recognition error correction model is obtained by training a preset model with an error-correction training data set, wherein the speech recognition error correction model is a neural network-based model, wherein the inputting the acoustic feature of the speech data, the first recognition result and the keyword to the pre-trained speech recognition error correction model to obtain the second recognition result comprises performing encoding and attention calculation on the acoustic feature of the speech data, the first recognition result and the keyword by using the speech recognition error correction model, to obtain the second recognition result based on a calculation result, wherein the performing encoding and attention calculation on the acoustic feature of the speech data, the first recognition result and the keyword by using the speech recognition error correction model to obtain the second recognition result based on the calculation result comprises:

performing encoding and attention calculation on each of the acoustic feature of the speech data, the first recognition result and the keyword by using an encoding layer and an attention layer of the speech recognition error correction model to obtain the calculation result; and decoding the calculation result by using a decoding layer of the speech recognition error correction model to obtain the second recognition result; and a recognition result determination unit configured to determine a final recognition result based on the second recognition result.

* * * * *

UNITED STATES PATENT AND TRADEMARK OFFICE
CERTIFICATE OF CORRECTION

| | | |
|---|---|---|
| PATENT NO. | : 12,183,326 B2 | Page 1 of 1 |
| APPLICATION NO. | : 17/773641 | |
| DATED | : December 31, 2024 | |
| INVENTOR(S) | : Xu et al. | |

It is certified that error appears in the above-identified patent and that said Letters Patent is hereby corrected as shown below:

On the Title Page

Item (73) Name of Assignee should be "IFLYTEK CO., LTD." Residence should be "Anhui (CN)"

Signed and Sealed this
Twenty-fifth Day of March, 2025

Coke Morgan Stewart
*Acting Director of the United States Patent and Trademark Office*